United States Patent Office 3,406,081
Patented Oct. 15, 1968

3,406,081
METHOD FOR PREPARING A COATED MEAT PRODUCT
Clifford D. Bauer, Gerald L. Neuser, and Hamilton A. Pinkalla, Milwaukee, Wis., assignors to W. R. Grace & Co., New York, N.Y., a corporation of Connecticut
No Drawing. Continuation-in-part of application Ser. No. 512,558, Dec. 8, 1965. This application Oct. 14, 1966, Ser. No. 586,641
1 Claim. (Cl. 99—194)

ABSTRACT OF THE DISCLOSURE

The present invention concerns a method for preparing a coated meat product by coating the meat with a water-in-oil emulsion and solidifying said coating.

---

This application is a continuation-in-part of our earlier filed application Ser. No. 512,558, filed Dec. 8, 1965 now abandoned.

The present invention relates to frozen meat products and more specifically to novel frozen meat products which are covered with a solid substantially continuous vapor impervious coating.

It is generally known that both fresh and frozen meat, when subjected to extended storage, loses substantial water due to evaporation. Prior workers have developed various edible coating techniques which restrict water loss.

Typical coatings which have been suggested include those containing gelatin, acetylated monoglycerides and various and modified fats and oils which may contain preservatives and/or seasoning agents. These prior art coating compositions, while they yield some benefit in the application to fresh meat, are not generally satisfactory when applied to frozen meat products. This is due to the fact the components or the physical characteristics of the coating are either not compatible with the meat when it is subsequently thawed and cooked, or the coating, as in the case of those which comprise modified fats and oils, tends to embrittle upon freezing and cracks.

It is therefore an object of the present invention to provide an improved coating for frozen meat products.

It is another object to provide a coated frozen meat product which will undergo extended periods of frozen storage.

It is another object to provide a frozen meat coating which does not embrittle upon freezing and which is completely compatible with the meat coated thereby.

These and still further objects of the present invention will become readily apparent to one skilled in the art from the following detailed description and specific examples.

Broadly, our present invention contemplates a coated frozen meat product the coating of which comprises an edible water-in-oil emulsion applied substantially uniformly and continuously over the meat and solidified thereon.

More specifically, we have found that the edible water-in-oil emulsions hereinafter defined, when applied to frozen meat products will form a continuous substantially water vapor imprevious coating. This coating will not crack or deteriorate during extended cold storage. Furthermore, the present coating compositions are completely compatible with substantially all meat products and will be advantageously absorbed during subsequent thawing and cooking.

In a particularly useful embodiment of the present invention the present water-in-oil emulsions contain various seasoning and/or stabilizing coloring or preserving ingredients which have heretofore been added to meat products by way of conventional applying techniques.

The water-in-oil emulsions used in the present invention are generally disclosed in U.S. Patent 3,223,532, dated Dec. 14, 1965 to Pinkalla et al. The present water-in-oil emulsions contain fat, emulsifiers and water in certain ratios which provide a stable water-in-oil emulsion. Generally speaking, the present emulsions contain from about 6 to 98 parts by weight of fat, 2 to 74 parts by weight of water, and from about 0.1 to 22 parts by weight of an emulsifier composition which contains from about 1 to 12 parts of compatible non-ionic hydrophilic and lipophilic emulsifiers which yield a hydrophilic and lipophilic balance of about 3 to 6 as defined by Becker ACS Monograph 135, 1956; and from about 0 to 10 parts by weight of an edible wax. Furthermore, the ratio of the hydrophilic to the lipophilic emulsifiers range from about 0 to 75% by weight hydrophilic emulsifier and from 100 to 25% by weight of lipophilic emulsifier. The lipophilic emulsifier should have an iodine value of greater than 8.

Fats used in the preparation of the present emulsion comprise any edible fat of animal or vegetable origin. Typically, these fats include oils derived from plants such as corn oil, cotton seed oil, safflower seed oil, soybean oil, and so forth. Typical animal derived fats which may be used are chicken fat, beef fat and pork fat and modified (hydrogenated etc.) forms thereof.

Both fat as water compatible coloring agents such as B-carotene and various color lakes may also be combined with the present compositions. It is also contemplated that viscosity controlling agents such as methyl cellulose may be added.

In one preferred practice of the present invention a non-flavored emulsion base may be prepared and packaged. This base emulsion may then be combined with desired flavorings at subsequent time. Such a procedure reduces the number of prepared compositions which need be kept on hand for a variety of meat products.

The emulsifiers which may be used in the practice of the present invention are generally defined as edible non-ionic hydrophilic and lipophilic emulsifiers having a total hydrophilic lipophilic balance (HLB) of from about 3 to 6. Typical examples of hydrophilic emulsifiers which may be used are described in Table I below.

TABLE I

| Chemical Name | HLB | ° F. or ° C. (M.P.) | Iodine Value | Average Percent Purity | Trade Name |
|---|---|---|---|---|---|
| Lecithin (O/W type) | | Soft plastic | 90–95 | 60.0 | Centrophil S.M. |
| Polyethylene glycol 400 distearate | 7.8 | 33°–38° C | <5 | 90.0 | S1009. |
| Polyethylene glycol 400 mono-oleate | 11.0 | <2° C | 31–40 | 100.0 | S1802. |
| Acetylated tartrated monoglyceride of veg. oil | 12.0 | Liq. at room temp | 45–55 | 8.5 | Drewmulse A.T.M.G. |
| Do | 12.0 | 130° F | 5 | 20.0 | TEM 4H. |
| Polyoxyethylene (20) sorbitan monostearate | 14.9 | Liq. at room temp | 1.5 | 100.0 | Glycosperse S20. |
| Do | 14.9 | do | 1.5 | 100.0 | Tween 60. |
| Acetylated tartrated glyceryl monostearate | 15.0 | 131° F | 3 max | 30.0 | Drewmulse ATMS Spec. |
| Do | 15.0 | 136° F | 3 max | 40.0 | Gloss-Add. |
| Do | 15.0 | Soft past room temp | 60 | 20.0 | TEM 4C. |
| Polyoxyethylene (20) sorbitan monooleate | 15.0 | Liq. at room temp | 19–22 | 100.0 | Glycosperse 020 |

NOTE.—Tested with lipophilic emulsifier, Myverol 18–71E.

Typical examples of primary lipophilic emulsifiers are given in Table II below.

TABLE II

| Chemical Name | HLB | ° F. or ° C. (M.P.) | Iodine Value | Average Percent Purity | Trade Name |
|---|---|---|---|---|---|
| Lecithin (W/O type) | | Liq. at room temp | 90-95 | 4.0 | Centrophil IP. |
| Glyceryl mono-oleate | 3.4 | 65° F | 70-80 | 42.5 | S1096. |
| Glyceryl mono-oleate from veg. fat | 3.5 | 118° F | 65-75 | 42.5 | GMV soft. |
| Glyceryl mono-oleate from cottonseed oil | 3.5 | 110° C | 80-90 | 42.5 | Do. |
| Glyceryl mono-oleate from coconut oil | 3.5 | 90° F | 6-10 (avg.) | 52.5 | GM-CNO. |
| Glyceryl mono-oleate from peanut oil | 3.5 | 49° C | 80-90 | 42.5 | GM-PNO. |
| Glyceryl mono-oleate | 3.5 | Liq. at 68° F | 80-95 | 42.5 | GMO. |
| Do | 3.5 | Liq. at room temp | 74-78 | 56.5 | Atmos 300. |
| Do | 3.5 | 98° F | 65-70 | (¹) | Myverol 18-71E. |
| Do | 3.8 | 102°-108° F | 110-120 | 18 | Myverol 18-98. |
| Glyceryl mono-linoeate | | | | 74 | |
| Glyceryl mono-stearate | 3.8 | 115°-122° F | 54-64 | 42.0 | Atmul 80. |
| Do | 3.8 | 125°-127° F | 54-61 | 67.0 | Atmul 122. |
| Glyceryl mono-oleate | 5.2 | 20° C | 65-75 | 38.0 | S1097. |

¹ 90 minutes.

NOTE.—Tested with hydrophilic emulsifier, Drewmulse ATMS Spec.

In addition to the lipophilic emulsifiers listed in Table II above, it also contemplated that secondary lipophilic emulsifiers, generally described in the prior art as lipophilic "thinners", may be utilized in conjunction with the primary emulsifiers. Numerous examples of these lipophilic thinners are set forth in Table III below.

TABLE III

| Chemical Name | HLB | ° F. or ° C. (M.P.) | Iodine Value | Average Percent Purity | Trade Name |
|---|---|---|---|---|---|
| Glyceryl mono-oleate | 3.5 | 135°-142° F | <2 | 54.0 | Atmos 150. |
| Glyceryl mono-stearate | 3.6 | 134.6°-141.8° F | <5 | 42.5 | Aldo 53. |
| Do | 3.8 | 138°-142° C | <8 max | 42.0 | Atmul 84K. |
| Do | 3.8 | 140° F | 3 max | 42.5 | GMS-V hard-SE. |
| Glyceryl lactopalmitate | 4.0 | 140° F | 2 max | 12.0 | GLP-12. |
| Glyceryl lactostearate | 4.0 | 140° F | 2 max | 12.0 | GLS-12. |
| Do | 4.0 | 140° F | <5 max | 12.0 | SL 101. |
| Sorbitan mono-stearate | 4.7 | 122° F | 2½ | 100.0 | Glycomul S. |
| Do | 4.7 | 122° F | 5 | 100.0 | Span 60. |
| Glyceryl mono-stearate | 5.8 | 132.8°-141.8° F | <5 | 39.0 | Aldo 28. |
| Propyleneglycol stearate | 5.4 | 43°-46° C | <7 | 100.0 | Pegosperse PS. |

NOTE.—Tested with hydrophilic emulsifier, Drewmulse ATMS Spec. and lipophilic emulsifier, Myverol 18-71E.

Reference to Table II illustrates primary lipophilic emulsifiers which may be used. These primary emulsifiers have an iodine value of greater than about 8 which is required in the formation of the present emulsions. The lipophilic emulsifiers of Table III which have an iodine value of less than about 8 may be used as secondary emulsifiers or "thinners" to replace up to about 30% by weight of the primary lipophilic emulsifier.

The emulsifier system utilized in the practice of the present invention may if desired, contain an edible wax. Edible waxes which may be utilized in the practice of the present invention are vegetable or animal waxes such as beeswax, and candellila and carnauba waxes.

To prepare the present water-in-oil emulsions, it is generally preferred to first prepare a blend of the liquified fat or oil and the emulsifiers. This blend is usually brought to a liquid condition by heating to temperatures as required by the melting points of the components. This is normally about 60 to 80° C. Subsequent to preparing a homogenous blend of liquified fat and any oil flavoring or stabilizing agents which may be added to the composition, the water and any water soluble additives included therein, is added to the blended oil emulsifier composition and agitation is continued until a uniform emulsion results. Generally, during the adidtion of the water the rate of addition is regulated so that all the water is emulsified as it is added. This procedure aids in obtaining a uniform dispersion of water droplets throughout the continuous oil phase.

As indicated above, in a preferred embodiment of the present invention the water-in-oil emulsion coatings contemplated herein contain various seasoning and/or preservative agents. Typical seasonings which may be incorporated in the present coating compositions include salt, dehydrated onion, pepper, nutmeg, protein hydrolysates and autolysates, sugar, tomato puree, apple juice and so forth. In addition, preservative agents such as sorbic acid and/or benzoic acid or its salts may be included. In general, it is found that the combined weight of the seasoning and preservative agents added to the compositions contemplated herein range from 0 to about 75% weight of the emulsion prepared. However, this ratio is not particularly critical and practically any range of additives may be utilized so long as the required water, oil emulsifier balance is maintained.

Meat products which may be coated with the present composition include practically all types of edible proteinaceous materials. Typical examples are various cuts of pork, beef, chicken, as well as comminuted meats and sausage type products derived therefrom. Furthermore, it is contemplated that various fish products, such as fish, shrimp, clams, oyster and so forth may be advantageously coated. It is also contemplated that various synthetic meat products as prepared from plant protein may be advantageously coated and combined with the coatings contemplated herein.

In one particularly useful embodiment of the present invention relatively small pieces of meat are coated with the present composition such as pork chops or various chicken parts. These coated cuts of meat are of a size which are convenient for packaging and subsequent cooking and consuming by the consumer. It is also contemplated that substantially whole or halved animal carcasses may be advantageously coated with the edible compositions set forth herein. Such coating may be effectively used to reduce the water loss and shrinkage normally encountered in the cold storage of large cuts of meat.

The present coating compositions are preferably uniformly applied to frozen meat by means of a dipping or spraying technique. Typically a frozen or substantially frozen piece of meat may be dipped into liquid body of the present coating composition. The thickness of the coating on the meat depends upon the viscosity at a given temperature, the temperaure of the meat and the immersion time of the meat in the coating.

Ordinarily speaking, it is generally preferred to coat the product with a thickness of from about .01 to about 0.1 inch in thickness. However, the thickness of the coating may be varied according to individual requirements.

Frozen meat pieces which are treated in accordance with the coating technique described herein should be maintained at a temperature on the order of less than about 10° F. When the meat being coated is maintained at this temperature the temperature of the coating composition is generally maintained at from about 80 to about 150° F. whereat the composition is fluid, however, not sufficiently warm to cause undue thawing of the meat surface.

The meat products coated in accordance with the present invention are capable of undergoing extended storage periods without undergoing any substantial dehydration. Storage temperatures on the order of from about 0° F. to about −50° F. are normally sufficient to maintain the present coating in a continuous and uniform state throughout the storage period.

The meat products coated in accordance with the present invention may be cooked or partially cooked prior to coating or may be substantially raw. To prepare the present products for eating, the coated meat product is placed in an oven and heated to the temperature required for thawing and/or complete cooking. The coating compositions contemplated herein are found to possess the unique ability of substantially and uniformly absorbing throughout the meat product upon cooking. It is found that the water-in-oil emulsions which possess a continuous oil phase, will not unduly spatter upon heating and are sufficiently compatible with the meat so as to be absorbed thereby. In the event flavoring or stabilizing ingredients have been added to the coating composition these flavoring agents are carried by the molten coating composition upon cooking throughout the entire meat product. Hence, it is seen the present coating composition provides a means for sealing the meat surface against dehydration loss during storage and furthermore provides an advantageous carrier and application means for flavoring agents upon cooking.

Having described the basic embodiments of the present invention the following examples are given to illustrate specific practice thereof.

EXAMPLE I

A poultry coating composition was prepared from the following ingredients:

| Ingredients: | Percent by weight |
| --- | --- |
| Vegetable oil | 35.60 |
| Beeswax, edible natural | 1.40 |
| Monoglycerides | 1.40 |
| Water | 39.30 |
| Protein autolysate (Bio–Sol 15530) | 13.32 |
| Dehydrated onion powder | .16 |
| Poultry seasoning spice mixture | .53 |
| Sugar | 7.97 |
| Sorbic acid | .10 |
| Sodium benzoate | .10 |
| Dehydrated parsley | .12 |
| Color as desired. | |

The vegetable oil, beeswax and monoglycerides were admixed and blended at a temperature of 110° F. The water soluble ingredients which included the protein autolysate, dehydrated onion, spice mixture, sugar, sorbic acid, sodium benzoate and parsley and water were then mixed and brought to a temperature of about 110° F. The fat composition while maintained at 110° F. was placed under agitation and the aqueous mixture was added to the fat slowly with continuous agitation. The mixing was continued for 10 minutes following the completion of the addition of the water component and subsequently cooled to about 85° F. The resultant mixture was a smooth uniform emulsion.

Frozen chicken parts and pieces were then dipped into the above prepared emulsions which is maintained at a temperature of about 100° F. A coating of approximately 18% by weight of the coated chicken. The emulsion hardened to a non-greasy coating in about 10 seconds. These frozen pieces were then stored at temperatures below about 0° F. for several weeks. Subsequently, the frozen pieces were cooked in a covered aluminum pan for about 90 minutes in a preheated 425° F. oven. The resultant product was found to possess superior eating qualities.

EXAMPLE II

A pork seasoning coating was prepared from the following ingredients:

| Ingredients: | Percent by weight |
| --- | --- |
| Vegetable oil | 33.50 |
| Beeswax, edible natural | 1.40 |
| Monoglycerides | 1.40 |
| Apple juice | 58.00 |
| Protein autolysate (Bio–Sol 15530) | 5.26 |
| Dehydrated onion | .12 |
| Pepper | .03 |
| Salt | .03 |
| Nutmeg | .06 |
| Sorbic acid | .10 |
| Sodium benzoate | .10 |

The above ingredients were admixed by way of the procedure set foth in Example I.

Frozen pork chops having a temperature of about 0° F. were dipped into the emulsion heated to a temperature of about 100° F. This resulted in a coating of about 1/16 inch in thickness. The pork chops were then frozen and stored at a temperature of about 0° F. and upon subsequent cooking at 420° F. were found to possess superior eating qualities.

EXAMPLE III

A poultry coating was prepared from the following ingredients:

| Ingredients: | Percent by weight |
| --- | --- |
| Coconut oil | 36.9 |
| Mono- and diglycerides from cotton seed oil | 1.4 |
| Dehydrated onion powder | 1.0 |
| Poultry seasoning-spice mixture | .8 |
| Monosodium glutamate | .5 |
| Protein hydrolysate paste | 10.6 |
| Tartaric acid | .3 |
| Sorbic acid | .1 |
| Sodium benzoate | .1 |
| Sucrose | 7.5 |
| Water | 40.8 |

The mono- and diglycerides were liquified in the coconut oil. The remaining ingredients were then admixed with the water. The fat-glyceride mixture was placed in the mixing bowl of a planetary mixer, fitted with a whip, and mixed at intermediate speed. The aqueous mixture was added in a small stream at 100° F. to the fat, also maintained at 100° F. with continuous mixing. The mixing was continued for ten minutes, following the addition of the aqueous mixture, with cooling to about 80° F.

The coating was applied to pieces of frozen chicken by dipping them into the emulsion with continuous stirring. A coating approximately 1/16 inch in thickness was obtained, which set to a firm solid in a few seconds, and comprises approximately 18% of the weight of the coated meat.

The frozen pieces, after cooking in a foil coverad aluminum pan for 90 minutes in an oven preheated to 425° F., have superior eating qualities.

Example IV

To illustrate the practice of this invention by addition of the flavoring composition (spices and flavors) to a preformed water-in-oil emulsion, the following composition and procedures are given:

Emulsion: Percent by weight
- Coconut oil _____ 42.1
- Beeswax, natural _____ 1.7
- Glyceryl monooleate _____ 1.7
- Methylcellulose (4000 cps. viscosity type) ___ .6
- Tartaric acid _____ .1
- Sorbic acid _____ .1
- Sodium benzoate _____ .1
- Water _____ 53.6
- Color as desired.

The beeswax and glyceryl monooleate were liquified and dispersed in the coconut oil at a temperature of about 150° F. and held at a temperature of 115° F. The methylcellulose, tartaric acid, sorbic acid and sodium benzoate were mixed in the water and held at a temperature of 115° F. The fat composition was maintained at 115° F., with agitation, and the aqueous mixture added slowly, with continuous agitation. The mixing was continued for 10 minutes following the completion of the addition of the water component and cooled to about 85° F. The resultant mixture was a uniform and stable water-in-oil emulsion.

For the preparation of a poultry coating, utilizing the above emulsion, the following flavor composition was prepared:

Ingredients: Percent by weight
- Hydrolized plant protein _____ 41.5
- Dehydrated onion _____ 6.4
- Sucrose _____ 48.0
- Pepper _____ 1.3
- Dehydrated garlic _____ .3
- Dehydrated parsley _____ .6
- Mustard, dry _____ .6
- Celery salt _____ 1.3

The finely divided ingredients were dry blended to a uniform composition.

A coating for application to frozen chicken pieces was prepared by adding with mixing, 150 grams of the above flavor seasoning composition to 850 grams of the preformed water-in-oil emulsion, at a temperature of about 100° F. A coating of approximately 15% of the weight of the coated chicken is obtained. The emulsion hardened to a relatively non-greasy coating in about 10 seconds. These frozen pieces were stored at a temperature below 0° F. until use. The frozen pieces were cooked in a covered aluminum pan for about 90 minutes in a preheated 425° F. oven. The resultant product was found to possess superior eating qualities.

Example V

A poultry seasoning water-in-oil emulsion was prepared from the following ingredients:

Ingredients: Percent by weight
- Vegetable oil _____ 36.625
- Beeswax, natural _____ 1.410
- Glyceryl monooleate _____ 1.410
- Water _____ 37.749
- Protein autolysate _____ 13.250
- Poultry seasoning spice mixture _____ .531
- Dehydrated onion powder _____ .812
- Sucrose _____ 8.000
- Dehydrated parsley _____ .125
- Sorbic acid _____ .100
- Sodium benzoate _____ .100
- Methylcellulose, 4000 cps. _____ .538
- Tartaric acid _____ .350

The liquified vegetable oil, beeswax and glyceryl monooleate were admixed. Then the remaining ingredients were mixed with the water at 115° F. The liquified fat mixture heated to 115° F. was placed into the bowl of a planetary mixer fitted with a wire whip and operated at intermediate speed. The aqueous phase was added also at 115° F. in a small stream to the fat phase with continuous mixing. The mixing was continued for ten minutes following the addition of the water phase, with cooling to about 85° F. Raw chicken parts (legs, breasts, thighs, etc.) were cooked in boiling water for 25 minutes, air cooled, and frozen. The poultry seasoning described above was applied to the frozen pieces by dipping into the liquid, held at a temperature of 105° F. to give a uniform solidified coating. Coated pieces were packaged in disposible aluminum pans, covered with aluminum foil, and stored in the freezer.

For cooking, the closed package was heated in an oven at 425° F. for 30 minutes, the foil covering was removed and the heating continued for an additional 15 minutes. The chicken was found to have superior eating qualities.

Example VI

A barbeque flavoring water-in-oil emulsion coating has the following composition:

Ingredients: Percent by weight
- Vegetable oil _____ 35.625
- Beeswax _____ 1.410
- Glyceryl monooleate _____ 1.410
- Barbeque sauce _____ 31.250
- Tomato juice _____ 18.690
- Protein autolysate _____ 7.812
- Dehydrated onion _____ .625
- Worcestershire sauce _____ .125
- Corn syrup _____ 2.190
- Chili powder _____ .125
- Sorbic acid _____ .100
- Sodium benzoate _____ .100
- Methylcellulose, 4000 cps. _____ .538

The liquified vegetable oil, beeswax and glyceryl monooleate were admixed. The remaining ingredients were combined and mixed. The liquified fat mixture at 115° F. was placed into the bowl of a planetary mixer fitted with a wire whip and operated at intermediate speed. The aqueous phase, also at 115° F. was slowly added to the fat phase with continuous mixing. The mixing was continued for ten minutes, following the addition of the water phase, with cooling to about 85° F.

Raw beef patties (ground chuck) were cooked in a closed aluminum foil pan in a 425° F. oven for 20 minutes and frozen. The barbeque seasoning described above was applied to the frozen pieces by dipping into the liquid held at a temperature of 105° F. to give a uniform solidified coating. The coated pieces were packaged in disposible aluminum pans, covered with aluminum foil and stored in the freezer. For cooking the closed package is heated in the oven at 425° F. for 20 minutes. The beef patties were found to be juicy and flavorful.

Example VII

A pork seasoning coating has the following composition:

Ingredients: Percent by wt.
- Vegetable oil _____ 33.50
- Beeswax, natural _____ 1.40
- Glyceryl, monooleate _____ 1.40
- Apple juice _____ 56.82
- Protein autolysate _____ 5.26
- Dehydrated onion _____ .50
- Pepper _____ .03
- Salt _____ .03
- Nutmeg _____ .06
- Sorbic acid _____ .10
- Sodium benzoate _____ .10
- Methylcellulose, 4000 cps. _____ .80

The liquified vegetable oil, beeswax and glyceryl monooleate were admixed. The remaining ingredients were added to the apple juice with mixing at 115° F. The fat mixture, at 115° F. were placed into the mixing bowl of a planetary mixer fitted with a wire whip and operated at intermediate speed. The aqueous phase was slowly added at 115° F. to the fat phase with continuous mixing. The mixing was continued for ten minutes following the addition of the water phase, with cooling to about 85° F.

Raw pork chops were cooked in a closed aluminum pan in a 425° F. oven for 30 minutes and frozen. The pork seasoning coating described above was applied to the frozen pieces by dipping into the liquid held at a temperature of 105° F. to give a uniform solidified coating. The coated pieces were packaged in a disposible aluminum pan, covered with aluminum foil and stored in a freezer.

In preparing for serving, the closed package is heated in an oven at 400° F. for thirty minutes. The pork chops were found to have superior eating qualities.

The above specific examples clearly indicate that the coating compositions herein may be advantageously used to coat a variety of meat products. It was found that during extended storage periods ranging up to several months the meat products coated in accordance with the present invention did not undergo any substantial weight loss. Furthermore, it was found that upon cooking the compositions were substantially completely absorbed by the meat product.

We claim:
1. A method for preparing a coated meat product which comprises coating the meat product with an edible water-in-oil emulsion, which emulsion comprises (1) from about 6 to 98 parts by weight fat, (2) from about 2 to 74 parts by weight water, and (3) from about 0.10 to about 22 parts by weight of an emulsifying composition containing (a) from about 1 to 12 parts by weight of an edible non-ionic hydrophilic and lipophilic emulsifier having an HLB of from about 3 to 6, said hydrophilic emulsifier being present in amounts ranging from 0 to 75% by weight of the emulsifier composition, said lipophilic emulsifier being present in amounts varying from about 100 to 25% by weight of the emulsifier combination, the lipophilic emulsifier having an iodine value of greater than 8 and (b) from about 0 to about 10 parts by weight edible wax, and solidifying said coating thereon, whereby the solidified emulsion effectively reduces the water loss and shrinkage normally encountered in the cold storage of meat and is uniformly absorbed throughout the meat on cooking.

References Cited
UNITED STATES PATENTS 3,223,532  12/1965  Pinkalla et al. _____ 99—166 X HYMAN LORD, *Primary Examiner.*